(12) United States Patent
Nishiki

(10) Patent No.: US 7,034,915 B2
(45) Date of Patent: Apr. 25, 2006

(54) FLEXIBLE SUBSTRATE SUPPORT STRUCTURE INCLUDING A TEMPORARY RIGID SUBSTRATE WITH TRENCHES

(75) Inventor: Hirohiko Nishiki, Tenri (JP)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/144,547

(22) Filed: Jun. 3, 2005

(65) Prior Publication Data

US 2005/0237474 A1    Oct. 27, 2005

Related U.S. Application Data

(62) Division of application No. 09/929,708, filed on Aug. 13, 2001, now Pat. No. 6,934,001.

(51) Int. Cl.
*G02F 1/1333* (2006.01)
*G02F 1/13* (2006.01)
(52) U.S. Cl. ........................ 349/158; 349/187
(58) Field of Classification Search ................ 349/158, 349/187
See application file for complete search history.

(56) References Cited

U.S. PATENT DOCUMENTS

| | | | | |
|---|---|---|---|---|
| 5,399,390 A | * | 3/1995 | Akins | 428/1.62 |
| 5,416,341 A | * | 5/1995 | Hayama | 257/59 |
| 5,892,558 A | * | 4/1999 | Ge et al. | 349/43 |
| 6,052,165 A | * | 4/2000 | Janssen | 349/84 |
| 2002/0031622 A1 | * | 3/2002 | Ippel et al. | 428/1.6 |

* cited by examiner

*Primary Examiner*—Tarifur R. Chowdhury
(74) *Attorney, Agent, or Firm*—David C. Ripma

(57) ABSTRACT

A flexible liquid crystal display (LCD) substrate support structure and a method of supporting a flexible LCD substrate during fabrication have been provided. The method forms channels or trenches in-between a rigid support substrate and the flexible LCD substrate. A vacuum is created in the channels or trenches to pull adhesive in. The adhesive formed in this manner contains no air or water bubbles whose expansion in subsequent LCD fabrication processes can destroy the integrity of thin film transistor films formed on the flexible LCD substrate.

12 Claims, 7 Drawing Sheets

FLEXIBLE SUBSTRATE SUPPORT STRUCTURE INCLUDING A TEMPORARY RIGID SUBSTRATE WITH TRENCHES

RELATED APPLICATIONS

This application is a Divisional Application of a patent application entitled, STRUCTURE AND METHOD FOR SUPPORTING A FLEXIBLE SUBSTRATE, invented by Hirohiko Nishiki, Ser. No. 09/929,708, filed Aug. 13, 2001 now U.S. Pat. No. 6,934,001.

BACKGROUND OF THE INVENTION

1. Field of the Invention

This invention generally relates to liquid crystal display (LCD) fabrication and, more particularly, to a structure and method for supporting a flexible LCD substrate during manufacturing.

2. Description of the Related Art

Thin film transistor (TFT) LCD displays are widely used with notebook type personal computers (PCs) due to their light weight and thin silhouette. More recently, TFT LCDs have been adapted for with personal digital assistants (PDAs), cellular telephones, and handheld game machines. These new applications demand less costly displays, while desktop PC applications demand higher image quality. TFT LCD displays are needed with enough diversification to satisfy both these contradictory requirements. For instance, poly-Si (polycrystalline silicon) TFT LCDs are suitable for the monitor of a notebook PC, because of their high image quality. Amorphous Si TFT LCDs are more suitable for use as a flat panel TV monitor, due to their lower cost. For the mobile devices, a flexible TFT LCD would be best type of display, as it can be made lighter and thinner, and less susceptible to breakable.

A number of researchers are attempting to realize more practical TFT LCDs on a plastic substrate. However, there are a number of problems that prevent the realization of a practical plastic TFT LCD display. Due to its flexibility and thinness, it is hard to securely hold a plastic substrate during the fabrication process. To overcome this issue, glue, or an adhesive have been used to attach the plastic substrate to glass. This method is suitable to fabricate plastic TFT LCD displays using conventional TFT LCD factory equipment and processes designed for use with a glass substrate LCD. To some extent, this method has been able to suppress the expansion of plastic substrate in response to heat or water absorption. However, if any air or water remains between the plastic and glass substrate, the air expands in the vacuum process and subsequently deposited films are deposited on the plastic in its expanded state. After the substrate is returned to normal atmospheric pressure, the plastic contracts and the overlying film can become cracked. To improve the plastic substrate LCD process, all the air and water between the plastic substrate and the glass support member must be removed when the plastic is attached to the glass.

As noted in U.S. Pat. No. 6,214,460 (Bluem et al.), screen printing of adhesives is known in the art and is used advantageously to apply adhesives to selected areas on a substrate. The adhesive printed or coated areas can subsequently be used to adhere to a second substrate. Typical screen-printable adhesives are pressure-sensitive adhesives which are tacky at room temperature, or heat-activatable adhesives, which are not tacky at room temperature, but become tacky when heated. Examples of screen-printable adhesives include (meth)acrylic polymers and copolymers dispersed in an organic solvent or water.

Acrylic adhesives, both pressure-sensitive and heat-activatable types, are widely used in industry because they are stable over time, and they can be formulated to adhere to a wide variety of different surfaces. With the advent of more stringent environmental controls, the technology in adhesives in general has evolved from solvent-based materials to water-based materials, and to a degree, solvent-free materials. Solvent-free acrylate adhesives are known and fall in various categories of processing such as heat-activatable coating and radiation curing which includes E-beam curing, ultraviolet light processing, and gamma radiation processing. Solvent-free crosslinked compositions are known in the art, but they provide little utility for adhesively bonding to other substrates since they are highly crosslinked and do not flow or become tacky on heating. Ultraviolet light processed adhesives are also used. While known adhesives processed by ultraviolet light have their own utility and advantages, they do not screen print well because they tend to become stringy during screen printing.

As noted in U.S. Pat. No. 5,699,139 (Aastuen et al.), thermal or barometric variations can affect LCD performance. The LC material in the display must fill the region between the two substrates perfectly, and the variation in the spacing of the two layers must be tightly controlled. As the LCD heats up due to either absorption of light energy or by ambient conditions, the pressure within the cell begins to build. Alternatively, the internal pressure may change due to ambient barometric pressure variations which must also be accounted for. The thermal expansion of the LC material and the thermal expansion of the substrates enclosing this material may not match, creating an internal pressure increase with rising temperature. If the substrate material is plastic (and therefore somewhat flexible), the portions of the substrate between the separation spacers can bow, changing the separation between the substrates. If the pressure variation becomes too great, the bonding of the separation spacers or the edge sealing can be compromised, and the LC cell can delaminate. Conversely, if the temperature or barometric pressure is lowered, a partial vacuum can be created in this region, creating bubbles within the LC material that may interfere with the display of information or otherwise damage the display. If cracks are formed in the adhesive during fabrication of LCD, this pressure problem is further accentuated.

FIGS. 1a through 1e are partial cross-sectional views of a flexible LCD substrate 10 during stages of fabrication (prior art). A layer of adhesive 12 binds a support substrate 14 to a flexible substrate 16. Reference designator 18 is an area in the adhesive that contains a bubble of water, air, or some other gas or liquid.

In FIG. 1b a vacuum has been created as a result of some LCD fabrication process, and the bubble 18 has expanded. The flexible substrate 16 does not lie flat.

In FIG. 1c an integrated circuit (IC) film 20 has been deposited overlying the flexible substrate 16. The IC film 20 can be a base coat layer of silicon dioxide, for example, of a thin film of silicon. Since the underlying flexible substrate 16 is not flat, the IC film 20 does not lie flat of the support substrate 14.

In FIG. 1d the LCD substrate 10 is returned to normal atmosphere. There is air pressure acting on the bubble region 18, that has expanded in the vacuum of the previous fabrication process.

In FIG. 1e the IC film has cracked as a result of the air pressure acting on the bubble region. If the IC film 20 had been a base coat, for example, the cracks in the film will permit impurities from the support substrate to migrate into overlying areas, such as into the active regions of transistors. It should be understood that the cracks may form as a result of several vacuum or annealing process cycles. It should also be understood that cracks may likewise form in IC films several layers above (not shown) the support substrate 14.

It would be advantageous if a flexible plastic LCD substrate could be held completely rigid during fabrication to improve the mechanical and electrical characteristics of the final product.

It would be advantageous if the adhesive used to hold a flexible LCD substrate during fabrication could be more evenly distributed across the glass substrate.

It would be advantageous if the integrated circuit (IC) films overlying the flexible LCD substrate could be formed with a more uniform thickness, without cracks or weak areas. It would likewise be advantageous if the flexible LCD substrate could be adhered to remain flat during the LCD fabrication procedures, to promote the formation of more uniformly thick overlying IC films.

SUMMARY OF THE INVENTION

The present invention prevents cracking in the IC films overlying a flexible LCD substrate during fabrication, by insuring that no air or water remains between the flexible and glass substrates. This is accomplished by injecting adhesive between plastic (flexible) and glass (rigid) substrates using a vacuum.

Accordingly, a method is provided for mounting a flexible substrate during the fabrication of an LCD. The method comprises: forming a rigid support substrate with trenches, typically of glass; forming a flexible substrate overlying the support substrate, typically of plastic or metal films; injecting adhesive into support substrate trenches; curing the adhesive to attach the flexible substrate to the support substrate; depositing a plurality of patterned integrated circuit films overlying the flexible substrate and forming an LCD; and, detaching the support substrate and adhesive from the flexible substrate LCD.

More specifically, the trenches are formed with at least one trench mouth, and the adhesive is injected into support substrate trenches in a vacuum environment. Injecting adhesive into the support substrate trenches further includes: creating a vacuum environment in the support substrate trenches; supplying adhesive to the at least one mouth of the support substrate trenches; and, in response to returning the support substrate to ambient pressure, pulling the adhesive into the support substrate trenches vacuum environment through the at least one mouth.

Additional details of the above-described method, an alternate method for mounting a flexible substrate, and structures to support a flexible substrate LCD during fabrication are presented below.

DETAILED DESCRIPTION OF THE PREFERRED EMBODIMENTS

Figure 1A:
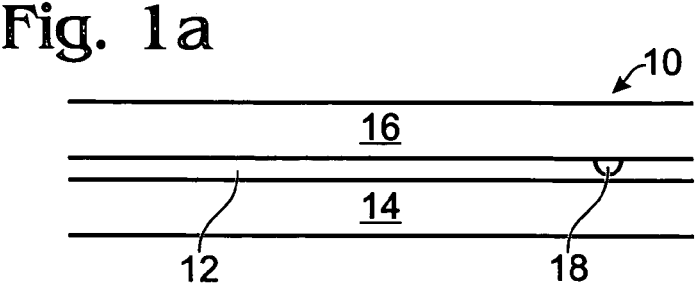
FIGS. 1a through 1e are partial cross-sectional views of a flexible LCD substrate during stages of fabrication (prior art).
Figure 1B:
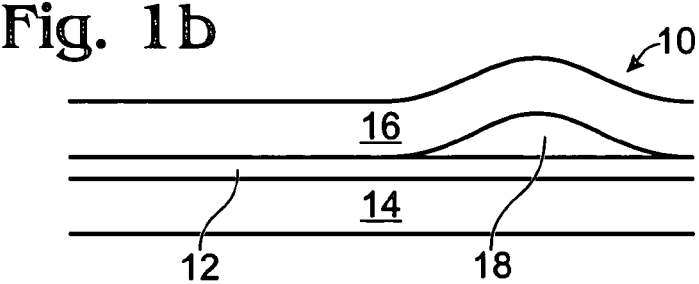
Figure 1C:
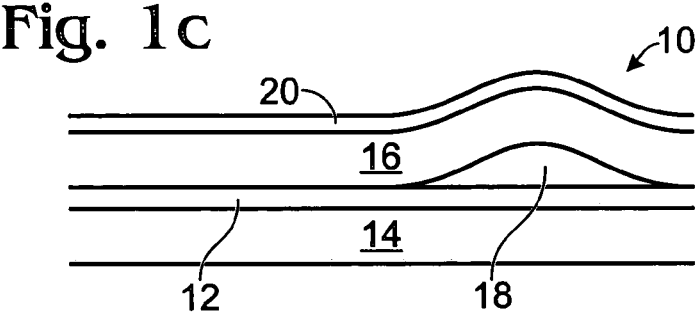
Figure 1D:
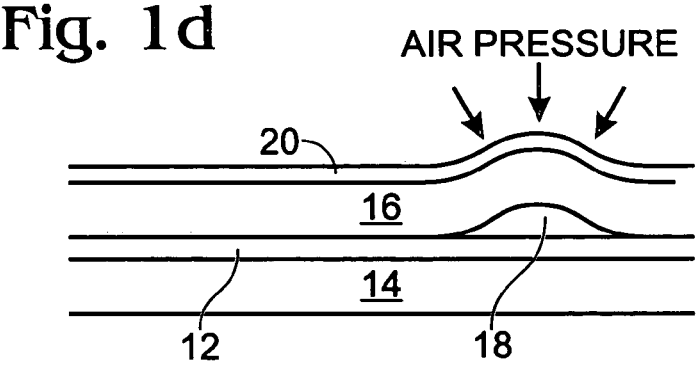
Figure 1E:
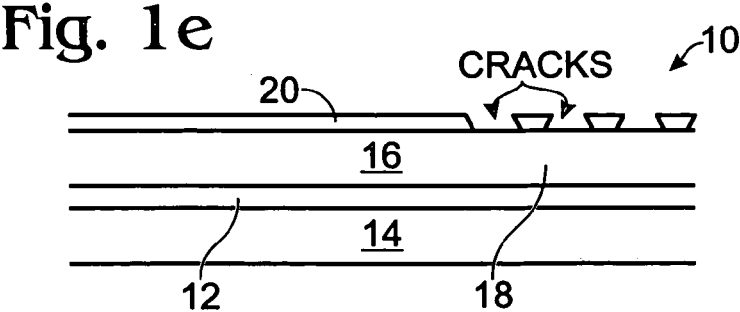
Figure 2:
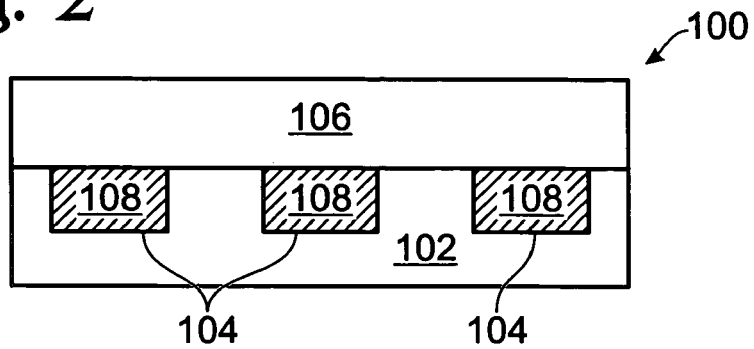
FIG. 2 is a partial cross-sectional view of the present invention structure to support a flexible substrate LCD during fabrication.

FIG. 2 is a partial cross-sectional view of the present invention structure to support a flexible substrate LCD during fabrication. The structure 100 comprises a first rigid temporary support substrate 102 with trenches 104. Typically, the rigid temporary support structure 102 is a glass material, but other materials such as plastic can be used. A first flexible substrate 106 overlies the first temporary support substructure. As is well known in the art, flexible LCD substrates are made from several types of plastic and metal films. Vacuum injected adhesive 108, represented by the cross-hatched areas, in the first temporary support substrate trenches 104 attaches the first temporary rigid support substrate 102 to the first flexible substrate 106.

In order to prevent incorporating any air or water between the flexible 106 and temporary support 102 substrates, the adhesive 108 is injected in a vacuum ambience. In the beginning of the process, many trenches 104 are made on the temporary support substrate 102. Then, the flexible substrate 106 is attached. After that, the adhesive is injected in the trenches and cured.

After attaching the flexible substrate 106 on the temporary support substrate 102, TFTs can be fabricated by conventional semiconductor manufacturing tools using optimum process conditions. Because there is no air or water bubbles between the flexible substrate 106 and the temporary support substrate 102, no cracks will form on any overlying films deposited in vacuum.

Figure 3:
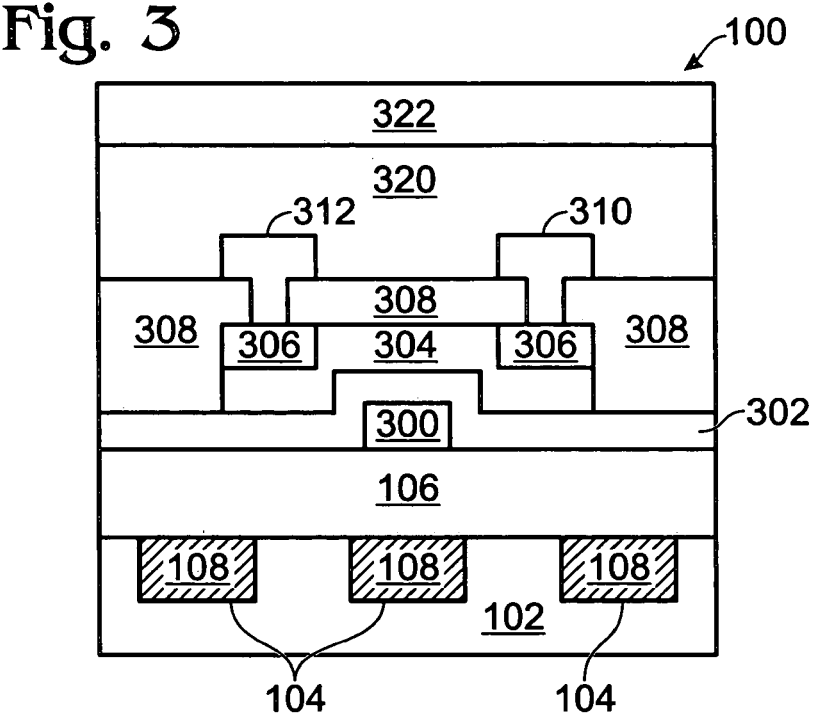
FIG. 3 is a partial cross-sectional view of the LCD support structure of FIG. 2 with IC films, formed into TFTs, overlying the first flexible substrate.

FIG. 3 is a partial cross-sectional view of the LCD support structure 100 of FIG. 2 with IC films, formed into TFTs, overlying the first flexible substrate. As shown, a TFT is formed having a gate busline 300, a gate insulator 302, an amorphous silicon layer 304, highly doped silicon regions 306, interlevel dielectric 308, source busline 310, and drain busline 312. The TFT is presented only as an example. The IC films could be other active or passive electrical devices, or the IC films could be stacks of TFTs. The present invention is not limited to any particular arrangement of IC films or the formation of any particular LCD active device.

Overlying the IC films (the TFT as shown) is a liquid crystal (LC) layer 320. The LC layer can be formed from a variety of materials and through a variety of processes, as are well known in the art. The present invention is not limited to any particular kind of LC layer. A color film (CF) 322 is shown overlying the LC layer. Again, the color film 322 is not critical to the invention, but shown as a typical film layer that would be used in the fabrication of a flexible substrate LCD.

Figure 4:
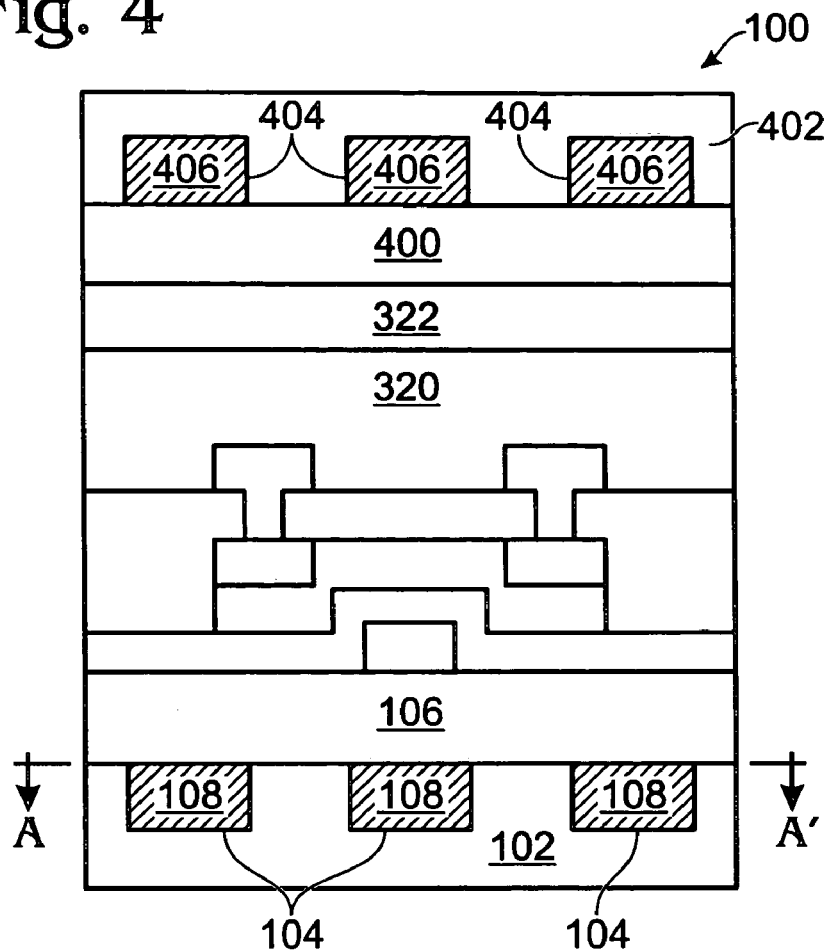
FIG. 4 is a partial cross-sectional view of the LCD support structure of FIG. 3 with an additional flexible substrate.

FIG. 4 is a partial cross-sectional view of the LCD support structure 100 of FIG. 3 with an additional flexible substrate. A second flexible substrate 400 overlies the color filter 322. A second rigid temporary support substrate 402 with trenches 404 overlies the second flexible substrate 400. Vacuum injected adhesive 406, shown as cross-hatched, in the second temporary support substrate trenches 402 attaches the second temporary rigid support structure 402 to the second flexible support structure 400.

Figure 5:
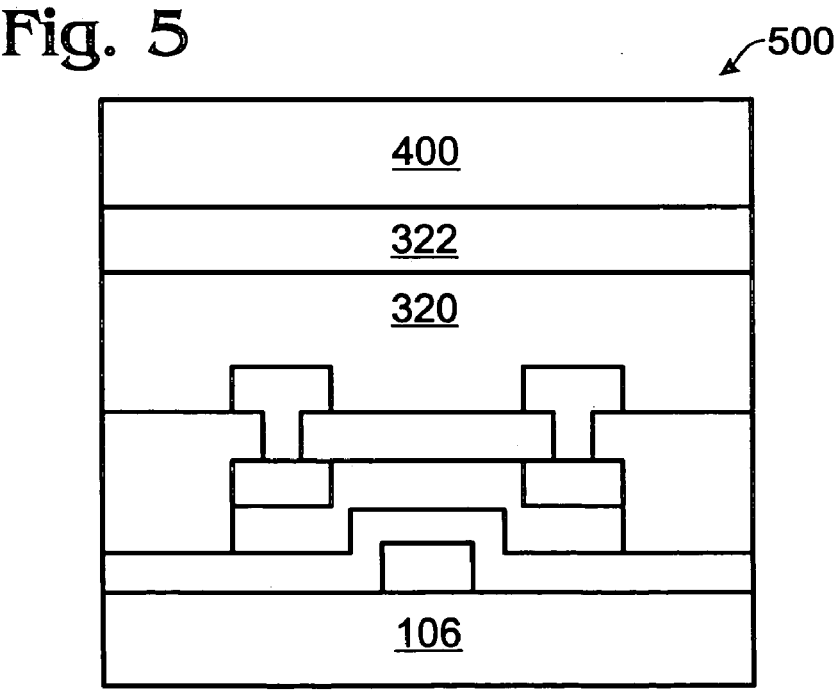
FIG. 5 is a partial cross-sectional view of the completed LCD, following the removal of the LCD temporary rigid support structures.

FIG. 5 is a partial cross-sectional view of the completed LCD 500, following the removal of the LCD temporary rigid support structures 102 and 402. At the final stage of the process, the temporary support substrates must be removed from the flexible substrate. In conventional processes this can be difficult because the adhesive is relatively thin and is formed uniformly between the flexible and temporary support substrates. However, with the present invention structure, the adhesive exists only in the trench, so the solvent can easily spread through the trench and remove the adhesive quickly and completely.

Figure 6:
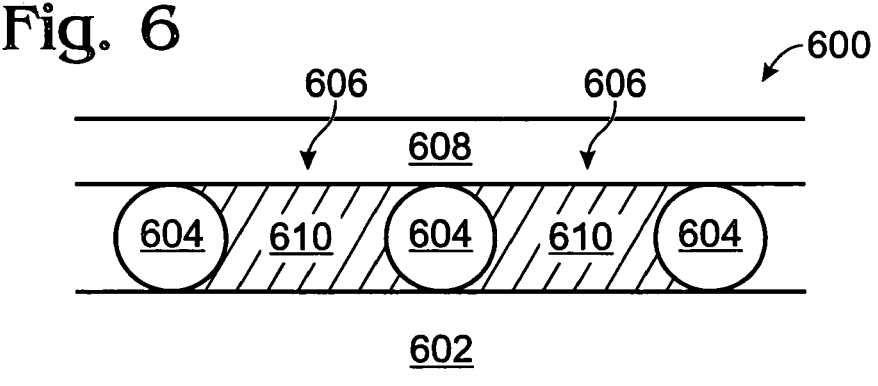
FIG. 6 is a partial cross-sectional view of an alternate structure to support a flexible substrate LCD during fabrication.

FIG. 6 is a partial cross-sectional view of an alternate structure to support a flexible substrate LCD during fabrication. The structure 600 comprises a first rigid temporary support substrate 602. As above, the first rigid temporary support substrate is typically glass or plastic. A first temporary pattern of spacers 604, with spacer channels 606 between the spacers 604, overlies the first temporary support structure 602. The spacers 604 can be a plastic or glass material, but other materials are acceptable. A first flexible substrate 608, typically a plastic or metal film, overlies the first temporary pattern of spacers 604 (and spacer channels). Vacuum injected adhesive 610 shown in the cross-hatched spacer channels 606 attaches the first temporary support substrate 602 to the first flexible substrate 608. As above, the first temporary support substrate 602 is glass and the first flexible substrate 608 is a plastic or metal film.

Figure 7:
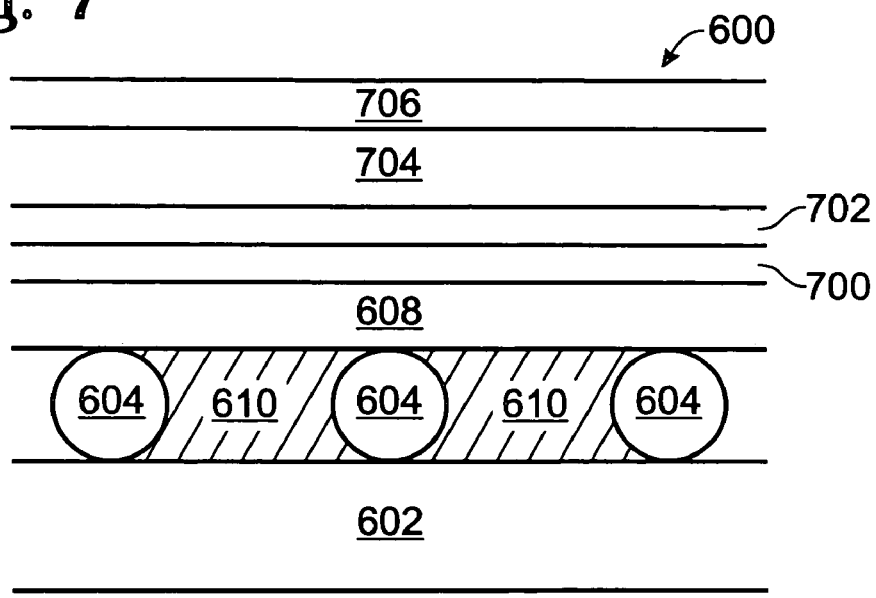
FIG. 7 is a partial cross-sectional view of the structure of FIG. 6 with integrated circuit films overlying the first flexible substrate.

FIG. 7 is a partial cross-sectional view of the structure of FIG. 6 with integrated circuit films 700 and 702 overlying the first flexible substrate 608. For simplicity, two unpatterned film layers are shown. However, these film layers, with additional layers could be part of a TFT or other active device (see FIG. 3). A liquid crystal (LC) layer 704 overlies the TFTs, or whatever the IC films 700 and 702 form. A color filter 706 overlies the LC layer 704.

Figure 8:
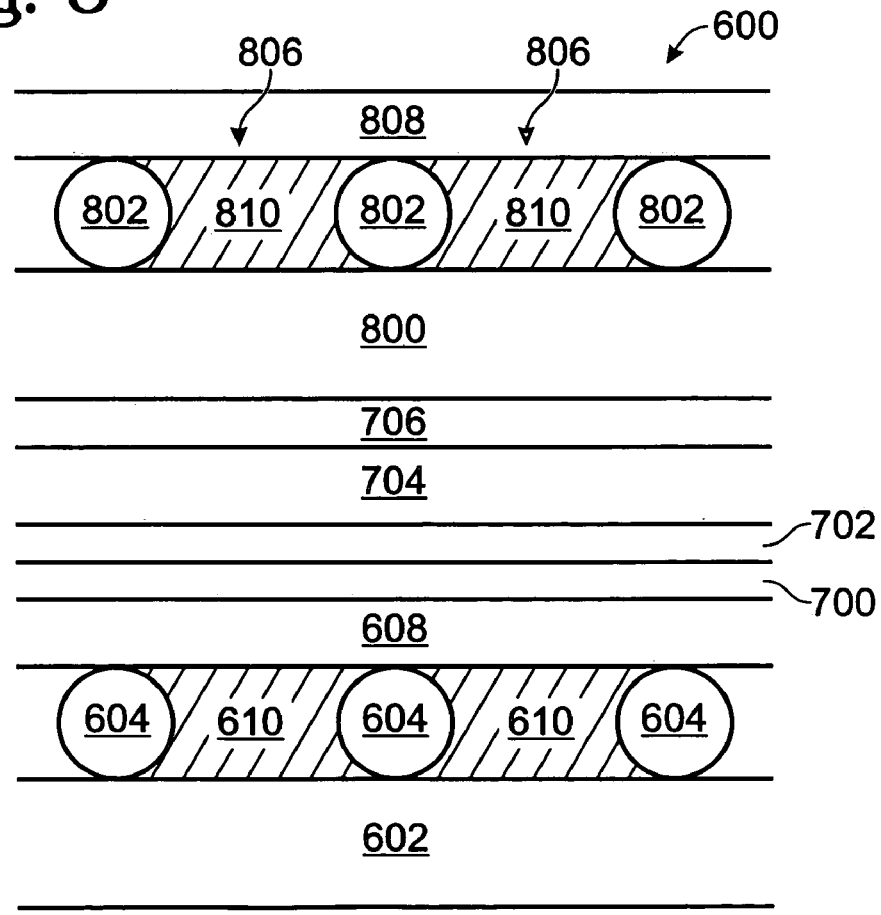
FIG. 8 is a partial cross-sectional view of the LCD support structure of FIG. 7 with an additional flexible substrate.

FIG. 8 is a partial cross-sectional view of the LCD support structure 600 of FIG. 7 with an additional flexible substrate. A second flexible substrate 800 overlies the color filter 706. A second temporary pattern of spacers 802, with spacer channels 804 between the spacers 802, overlies the second flexible substrate 800. A second rigid temporary support substrate 808 overlies the second temporary pattern of spacers 802 (and openings 806). Vacuum injected adhesive 810 in the cross-hatched spacer channels 806 attaches the second temporary support substrate 808 to the second flexible substrate 800.

At the finish of the fabrication processes the rigid support substrates are removed and the resulting LCD structure resembles the LCD of FIG. 5, described above. The structure 600 depicted in FIGS. 6–8 has the advantage that special glass substrates with trenching are not required.

Figure 9A:
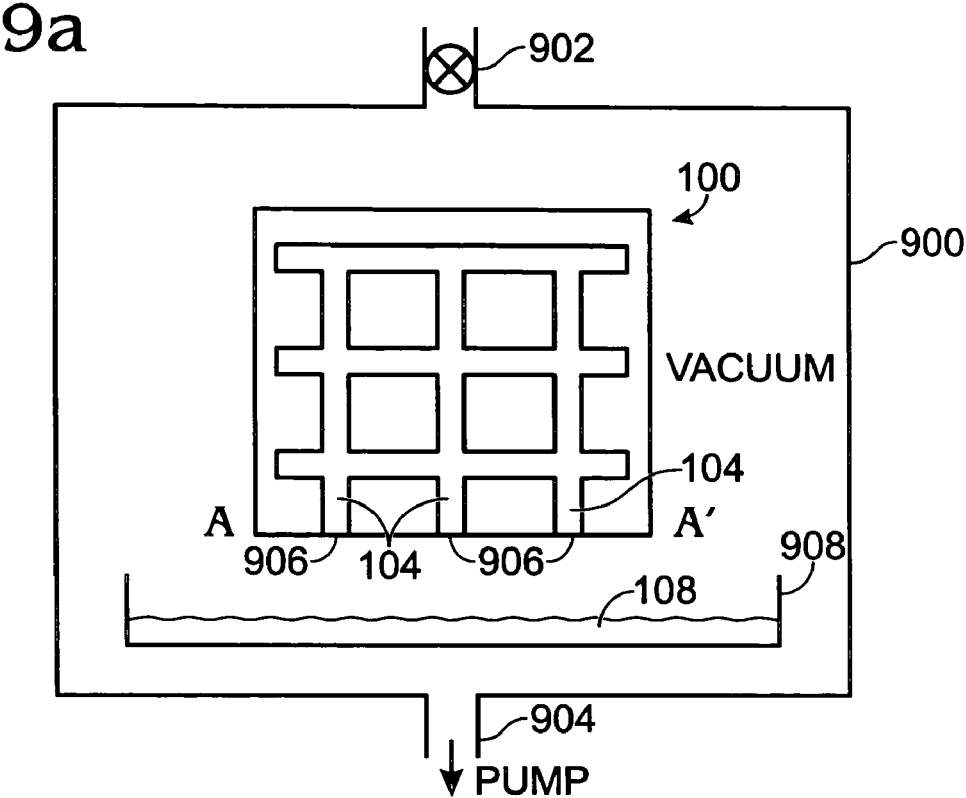
FIGS. 9a and 9b are schematic block diagrams illustrating the present invention flexible substrate support structure in an environmental IC process chamber.
Figure 9B:
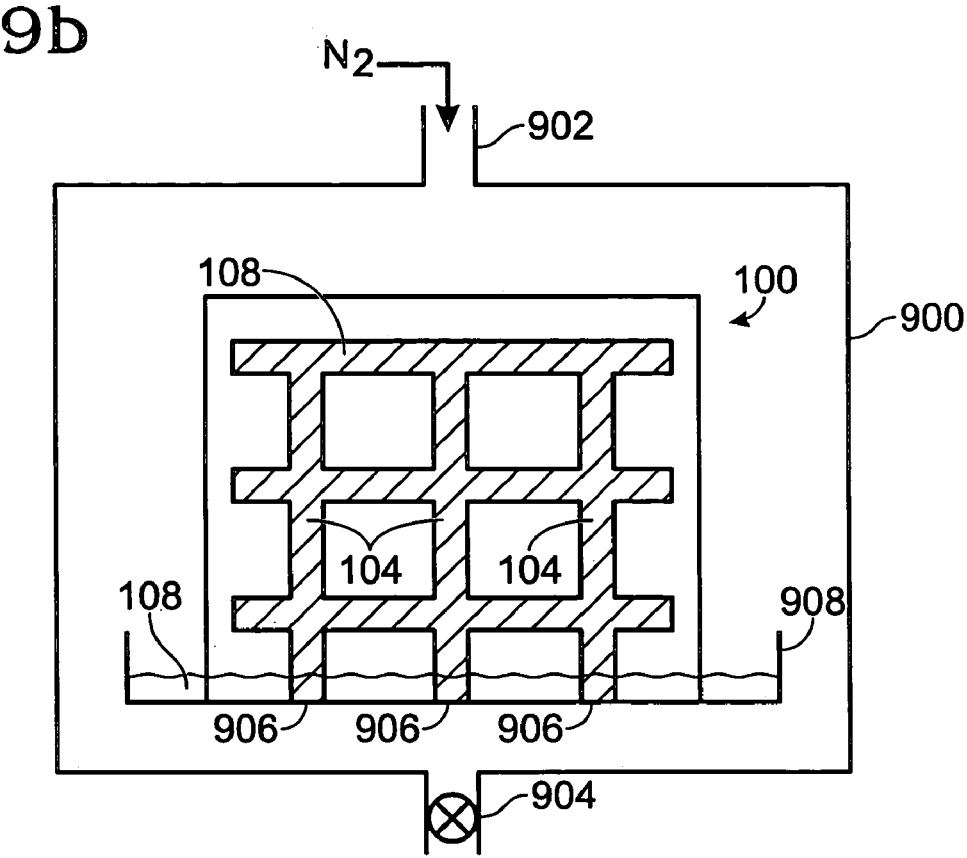

FIGS. 9a and 9b are schematic block diagrams illustrating the present invention flexible substrate support structure in an environmental IC process chamber. As shown, the chamber 900 has the input port 902 blocked and a pump (not shown) is engaged at the exhaust port 904 to create a chamber vacuum. The flexible substrate support structure 100 of FIG. 4 is shown in a cross-sectional (section A-A1, see FIG. 4) top plan view to expose the trenches 104 and trench mouths 906. The support structure 100 is positioned over tray 908 containing the adhesive 108. A vacuum is created in the trenches 104, as well as in the chamber 900 in general.

In FIG. 9b the mouth 906 of each rigid support substrate trench 104 has been immersed in the adhesive 108, while the chamber 900 is returned to higher pressure atmosphere, typically ambient (approximately 1 atmosphere). Since the vacuum, or negative atmosphere, exists in the trenches 104, the adhesive 108 is pulled through the mouths 906 to completely fill the trenches 104. The adhesive filled trenches are represented by the cross-hatched areas. This vacuum process does not permit the formation of air or water bubbles in the adhesive-filled trenches 104. In the event that the trenches are not completely filled with adhesive, the adhesive at the trench mouths 906 at least prevent the trench spaces from being filled with a gas or a liquid that will later expand in fabrication processes.

Figure 10:
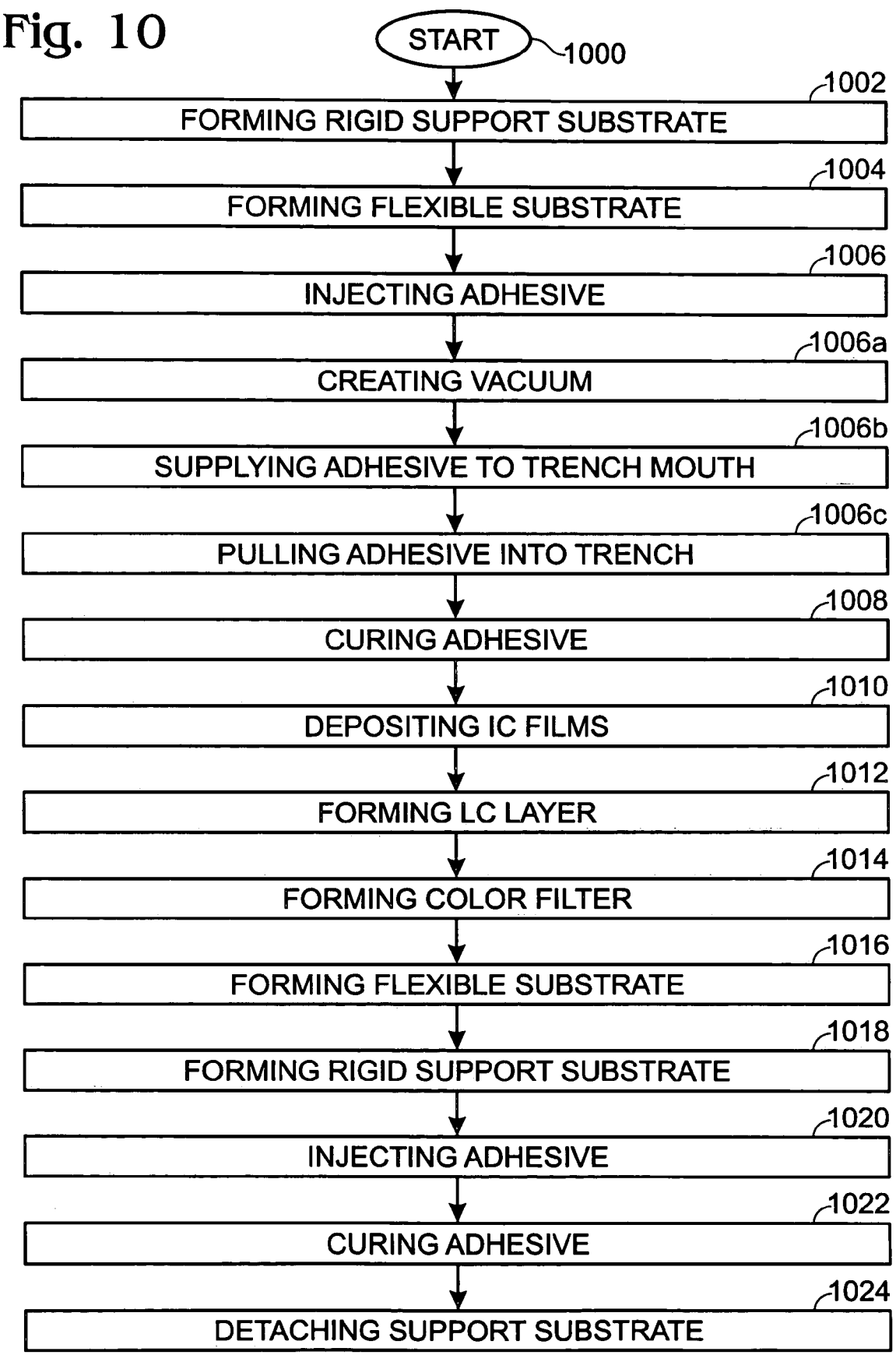
FIG. 10 is a flowchart illustrating the present invention method for mounting a flexible substrate during the fabrication of a LCD.

FIG. 10 is a flowchart illustrating the present invention method for mounting a flexible substrate during the fabrication of a LCD. Although this method, and the method of FIG. 11 below, is depicted as a sequence of numbered steps for clarity, no order should be inferred from the numbering unless explicitly stated. The method starts at Step 1000. Step 1002 forms a first rigid support substrate, typically of glass or plastic, with trenches. Step 1004 forms a first flexible substrate overlying the first support substrate. In some aspects of the invention the substrates mentioned in Steps 1002 and 1004 are formed previously, and these steps merely involve the introduction of these pre-formed substrates. Step 1006 injects adhesive into the first rigid support substrate trenches. Step 1008 cures the adhesive to attach the first flexible substrate to the first support substrate. Step 1010 deposits a plurality of patterned integrated circuit films overlying the first flexible substrate, and forms thin film transistors (TFTs). Step 1012 forms a liquid crystal (LC) layer overlying the TFTs. Step 1014 forms a color filter layer over the LC layer. Step 1016 forms a second flexible substrate overlying the color filter. Step 1018 forms a second rigid support substrate with trenches overlying the second flexible substrate. Step 1020 injects adhesive into the second rigid support substrate trenches. Step 1022 cures the adhesive to attach the second flexible substrate to the second support substrate. Step 1024, subsequent to the additional LCD fabrication processes of Steps 1012 and 1014, detaches the first support substrate and adhesive from the first flexible substrate. Typically, the second support structure is detached at the same time.

Forming a first rigid support substrate with trenches in Step 1002 includes forming trenches with at least one trench mouth, the same applies to Step 1018. Injecting adhesive into the first rigid support substrate trenches in Step 1006 (as well as Step 1020) includes injecting the adhesive in a vacuum environment. Step 1006, of injecting adhesive into the first support substrate trenches includes substeps. Step 1006a creates a vacuum environment in the first rigid support substrate trenches. Step 1006b supplies adhesive to the at least one mouth of the first rigid support substrate trenches. Step 1006c, in response to returning the first rigid support substrate to ambient pressure, pulls the adhesive into the first rigid support substrate trenches vacuum environment through the at least one mouth. Returning the first rigid support substrate to ambient pressure in Step 1006c includes supplying an N$_2$ atmosphere at ambient pressure.

Forming the first flexible substrate overlying the first rigid support substrate in Step 1004 includes forming a flexible substrate from a material selected from the group including plastic and metal films.

Forming the first rigid support substrate with trenches in Step 1002 includes substeps (not shown). Step 1002a forms a rigid support substrate with a top surface. Step 1002b forms a photoresist pattern with openings exposing the underlying support substrate top surface. Step 1002c etches the exposed support substrate top surface to form the trenches in the support substrate. Step 1002d removes the photoresist.

Figure 11:
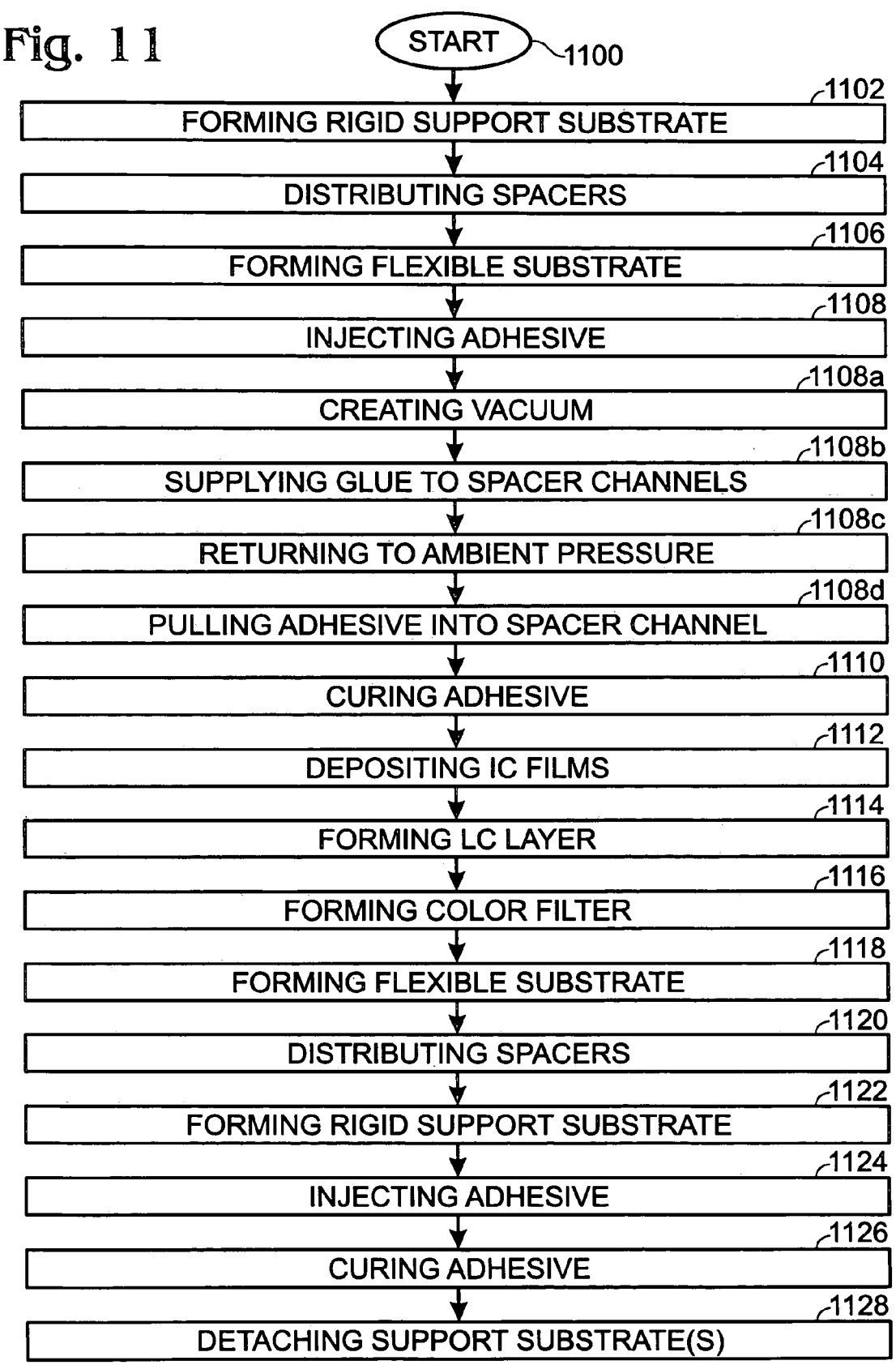
FIG. 11 is an alternate method for mounting a flexible substrate in the fabrication of a LCD.

FIG. 11 is an alternate method for mounting a flexible substrate in the fabrication of a LCD. The method starts at Step 1100. Step 1102 forms a first rigid support substrate, typically of glass or plastic. Step 1104 distributes a first pattern of spacers, with spacer channels between the spacers, overlying the first support substrate. Step 1106 forms a first flexible substrate overlying the first pattern of spacers, typically of a plastic of metal film material. Typically, Steps 1102, 1104, and 1106 involve the introduction of pre-formed substrates and spacers. Step 1108 injects adhesive into the spacer channels. Step 1110 cures the adhesive to attach the first flexible substrate to the first support substrate.

Step 1112 deposits a plurality of patterned integrated circuit films overlying the first flexible substrate, forming TFTs. Step 1114 forms a liquid crystal (LC) layer overlying the TFTs. Step 1116 forms a color filter layer over the LC layer. Step 1118 forms a second flexible substrate overlying the color filter. Step 1120 distributes a second pattern of spacers, with spacer channels between the spacers, overlying the second flexible substrate. Step 1122 forms a second rigid support substrate overlying the second pattern of spacers. Step 1124 injects adhesive into the spacer channels. Step 1126 cures the adhesive to attach the second flexible substrate to the second support substrate. Step 1128, subsequent to additional LCD fabrication processes of Steps 1112 through 1116, detaches the first support substrate, spacers, and adhesive from the first flexible substrate. Typically, the second rigid support structure is removed in the same step.

Distributing a pattern of spacers, with spacer channels between the spacers in Step 1104 includes forming spacer channels with at least one mouth. Injecting adhesive into the spacer channels in Step 1108 includes injecting the adhesive in a vacuum environment. Injecting adhesive into spacer channels in Step 1108 includes substeps. Step 1108a creates a vacuum environment in the spacer channels. Step 1108b supplies adhesive to the at least one spacer channel mouth. Step 1108c returns the first rigid support substrate to ambient pressure. Step 1108d, in response to returning the first rigid support substrate to ambient pressure, pulls the adhesive into the spacer channels vacuum environment through the at least one mouth. In some aspects, returning the first rigid support substrate to ambient pressure in Step 1108d includes supplying an N$_2$ atmosphere at ambient pressure.

A structure and method have been providing for supporting a flexible LCD substrate in the fabrication process. Examples have been provided for injecting an adhesive between the flexible substrate and the rigid support substrate, using a vacuum to prevent the formation of air or water bubbles. However, other methods of using a vacuum to aid in the injection of adhesive will occur to those skilled in the art. Further, although the invention specifically describes supporting an LCD flexible substrate, the invention is applicable to the support of any kind of flexible substrate.

I claim:

1. A structure to support a flexible substrate liquid crystal display (LCD) during fabrication, the structure comprising:
    a first rigid temporary support substrate with trenches;
    a first flexible substrate overlying the temporary support substrate; and
    vacuum injected adhesive in the trenches to attach the first temporary rigid support substrate to the first flexible support substrate.

2. The structure of claim 1 further comprising:
    integrated circuit (IC) films, formed into thin film transistors (TFTs), overlying the first flexible substrate.

3. The structure of claim 2 further comprising:
    a liquid crystal (LC) layer overlying the TFTs;
    a color filter overlying the LC layer.

4. The structure of claim 3 further comprising:
    a second flexible substrate overlying the color filter;
    a second rigid temporary support substrate with trenches overlying the second flexible substrate; and,
    vacuum injected adhesive in the second temporary support substrate trenches to attach the second temporary rigid support structure to the second flexible support structure.

5. The structure of claim 1 wherein the first temporary support substrate is made from a material selected from the group including glass and plastic.

6. The structure of claim 1 wherein the first flexible substrate is made from a material selected from the group including plastic and metal films.

7. A structure to support a flexible substrate liquid crystal display (LCD) during fabrication, the structure comprising:
    a first rigid temporary support substrate;
    a first temporary pattern of spacers, with spacer channels between the spacers, overlying the first temporary support substrate;
    a first flexible substrate overlying the first temporary pattern of spacers; and
    vacuum injected adhesive in the spacer channels to attach the first temporary support substrate to the first flexible substrate.

8. The structure of claim 7 further comprising:
    integrated circuit (IC) films, formed into thin film transistors (TFTs), overlying the first flexible substrate.

9. The structure of claim 8 further comprising:
    a liquid crystal (LC) layer overlying the TFTs; and,
    a color filter overlying the LC layer.

10. The structure of claim 9 further comprising:
    a second flexible substrate overlying the color filter;
    a second temporary pattern of spacers, with spacer channels between the spacers, overlying the second flexible substrate;
    a second rigid temporary support substrate overlying the second temporary pattern of spacers; and,
    vacuum injected adhesive in the spacer channels to attach the second temporary support substrate to the second flexible substrate.

11. The structure of claim 7 wherein the first temporary support substrate is made from a material selected from the group including glass and plastic.

12. The structure of claim 7 wherein the first flexible substrate is made from a material selected from the group including plastic and metal films.

* * * * *